United States Patent [19]

Shekleton

[11] Patent Number: 5,150,570
[45] Date of Patent: Sep. 29, 1992

[54] UNITIZED FUEL MANIFOLD AND INJECTOR FOR A TURBINE ENGINE

[75] Inventor: Jack R. Shekleton, San Diego, Calif.

[73] Assignee: Sundstrand Corporation, Rockford, Ill.

[21] Appl. No.: 455,563

[22] Filed: Dec. 21, 1989

[51] Int. Cl.⁵ ............................. F02C 7/22; F23R 3/32
[52] U.S. Cl. ....................................... 60/39.36; 60/738; 60/739
[58] Field of Search ................ 60/39.36, 737, 738, 60/739, 743, 746, 759, 760

[56] References Cited

U.S. PATENT DOCUMENTS

| | | | |
|---|---|---|---|
| 2,706,520 | 4/1955 | Chandler | 60/739 |
| 2,959,006 | 11/1960 | Ferrié | |
| 3,088,279 | 5/1963 | Diedrich | 60/39.36 |
| 3,099,134 | 7/1963 | Calder et al. | 60/746 |
| 3,269,116 | 8/1966 | Frasca et al. | |
| 3,613,360 | 10/1971 | Howes | 60/39.36 |
| 3,719,042 | 3/1973 | Chamberlain | |
| 3,968,644 | 7/1976 | Fehler | 60/746 |
| 4,047,877 | 9/1977 | Flanagan | |
| 4,280,324 | 7/1981 | Arliguie et al. | |
| 4,794,754 | 1/1989 | Shekleton et al. | 60/739 |

Primary Examiner—Richard A. Bertsch
Assistant Examiner—Timothy S. Thorpe
Attorney, Agent, or Firm—Wood, Phillips, Mason, Recktenwald & VanSanten

[57] ABSTRACT

The high cost of a fuel injection system in a turbine engine may be substantially reduced by utilizing a combination manifold/fuel injector (80) that is formed of a flattened tube (82) of annular shape and disposed within the case (58) of the engine in substantially surrounding relation to an annular combustor (44). The flattened tube includes fuel injecting apertures (88, 100) which need not be precision formed but which are aligned with the flared ends (74) of inlet tubes (70) extending into the combustor (44) from the plenum defined by the space between the combustor (44) and the case (58).

11 Claims, 2 Drawing Sheets

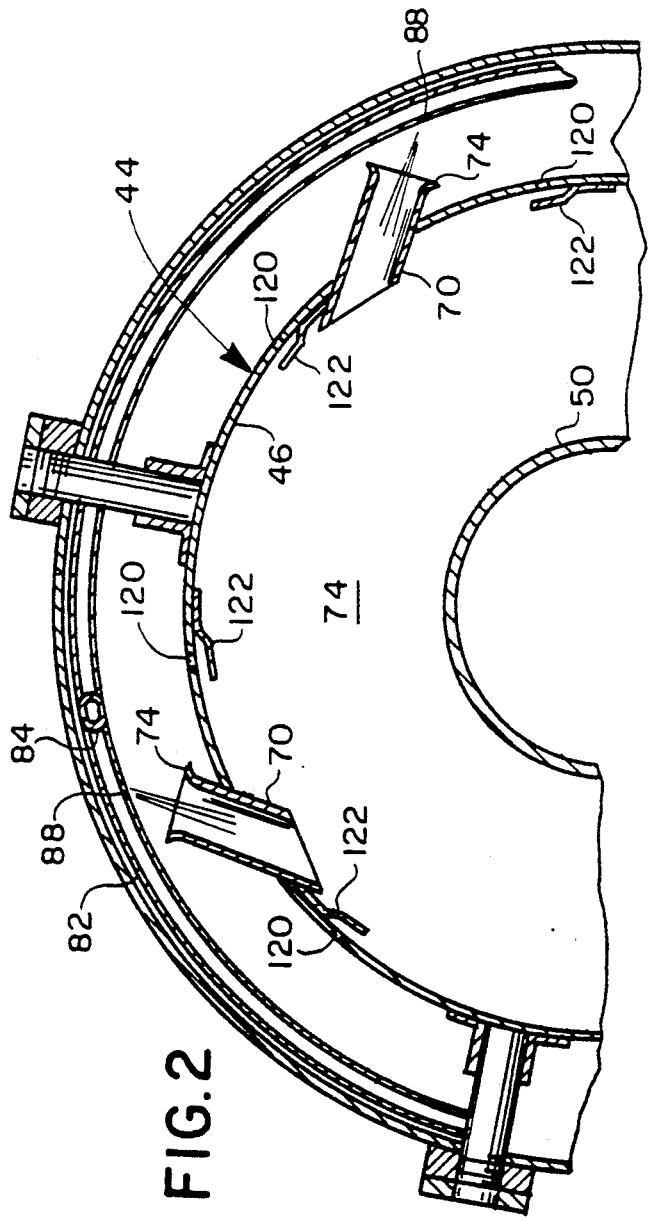
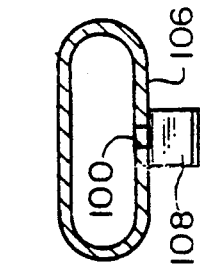
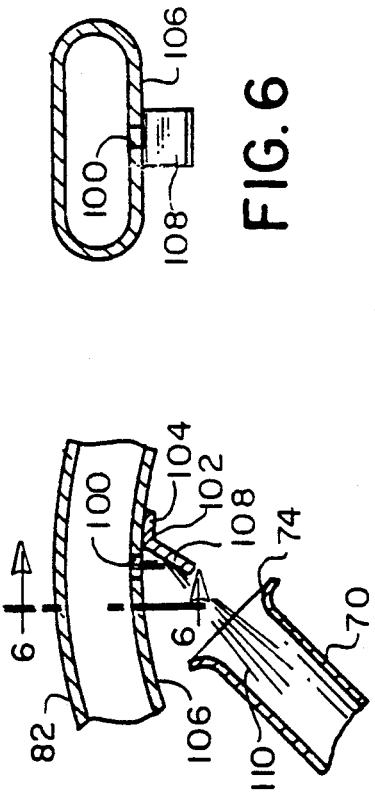
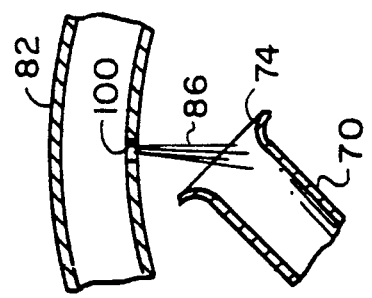
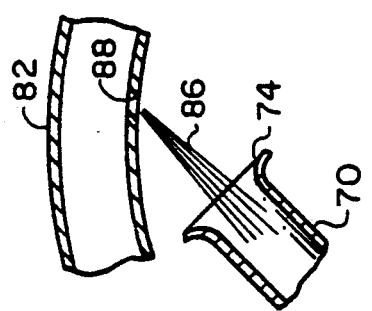

UNITIZED FUEL MANIFOLD AND INJECTOR FOR A TURBINE ENGINE

FIELD OF THE INVENTION

This invention relates to gas turbine engines, and more particularly, to improvements in the fuel injection systems therefor.

BACKGROUND OF THE INVENTION

As is well known, gas turbine engines are typically made up of a rotary compressor coupled to and driven by a turbine wheel. Hot gases of combustion generated in a combustor are directed against the turbine wheel to drive the same by a nozzle on the outlet side of the combustor. The gases of combustion are generated by combusting fuel injected into the combustor with the oxygen contained in compressed air received from the compressor.

Historically, in order to obtain good flame stability and uniformity as well as to prevent the formation of hot spots which could induce large thermal stresses within the apparatus and to prevent carbon buildup due to poor combustion which could in turn result in erosion of the nozzle and the turbine wheel by particulate carbon resulting from such buildup, a large fraction of the total cost of a turbine engine has resided in the cost of the fuel injectors.

This relatively high cost is due to the fact that many turbine fuel injection systems rely on so-called pressure atomization type fuel injectors which are designed to provide an extremely high degree of atomization of fuel under widely varying environmental conditions. In order to do such, such injectors are precision formed and may require numerous, extremely precise, machining operations in the course of their fabrication.

Even when the injection system relies on so-called air blast atomization, fairly high levels of precision are required in order that all injectors be very nearly identical so as to assure uniformity of fuel flow from one injector location to the other to prevent the formation of hot spots. Again, high cost results.

The present invention is directed to overcoming one or more of the above problems

SUMMARY OF THE INVENTION

It is the principal object of the invention to provide a new and improved gas turbine engine. More specifically, it is an object of the invention to provide a gas turbine engine with a fuel injection system that may be fabricated with relative ease and without the need for highly complex, precision fabrication operations so as to allow the engine in which the system is utilized to be fabricated at a minimum of expense.

According to the invention, the gas turbine engine that will typically employ the invention includes a rotary compressor, a rotary turbine wheel coupled to the compressor to drive the same, and an annular nozzle for directing gases of combustion at the turbine wheel. An annular combustor having an outlet connected to the nozzle is provided and a combustor case is disposed about the combustor in spaced relation thereto to define a plenum connected to the compressor.

According to the invention, angularly spaced inlet tubes are oriented generally tangentially to the interior of the combustor and extend into the same from the plenum to create circumferential gas flow within the combustor. According to one facet of the invention, a flattened tube of generally annular configuration is located within the plenum and is adapted to be connected to a source of fuel under pressure. Apertures are disposed in the flattened tube at angularly spaced locations corresponding to at least some of the inlet tubes and each aperture is aligned with a corresponding inlet tube.

According to another facet of the invention, a fuel tube of generally annular configuration is located within the plenum and is mounted on the case in spaced relation to the combustor and is adapted to be connected to a source of fuel under pressure. Apertures are included as before.

According to either facet of the invention, the structure is fabricated with the apertures and the tube serving as a combination manifold and injector which may be fabricated with relative imprecision as compared to the injectors of the prior art.

In one embodiment of the invention, both facets, that is, the use of a flattened tube and the mounting of the tube on the case in spaced relation to the combustor are combined in a single, structure.

The invention also contemplates that the apertures may be oriented to be generally tangential to the combustor to achieve improved atomization.

In another embodiment of the invention, impingement plates may be disposed in the path of fuel flowing from the apertures.

According to this embodiment, the impingement plates may be mounted on the tube. In a highly preferred form of this embodiment, the impingement plates have base sections secured to the flattened tube and impingement sections attached to the base section and extending away from the flattened tube into the corresponding path of fuel.

The invention, in a highly preferred embodiment, contemplates that the combustor have a radially outer wall and that the inlets be in a common plane transverse to the axis of rotation of the turbine wheel. In this embodiment, the radially outer wall is imperforate in the area whereat it is intersected by the plane.

Other objects and advantages will become apparent from the following specification taken in connection with the accompanying drawings.

DESCRIPTION OF THE DRAWINGS

FIG. 2 is a fragmentary, sectional view taken in a plane transverse to the rotational axis of the turbine and of a modified embodiment of the turbine;

FIG. 3 is an enlarged, fragmentary view of the embodiment of FIG. 2;

FIG. 4 is a view similar to FIG. 3 but of still another embodiment of the invention;

FIG. 5 is a view similar to FIGS. 3 and 4 but of still another modified embodiment of the invention; and FIG. 6 is a fragmentary, sectional view taken approximately along the line 6—6 in FIG. 5.

DESCRIPTION OF THE PREFERRED EMBODIMENTS

Figure 1:
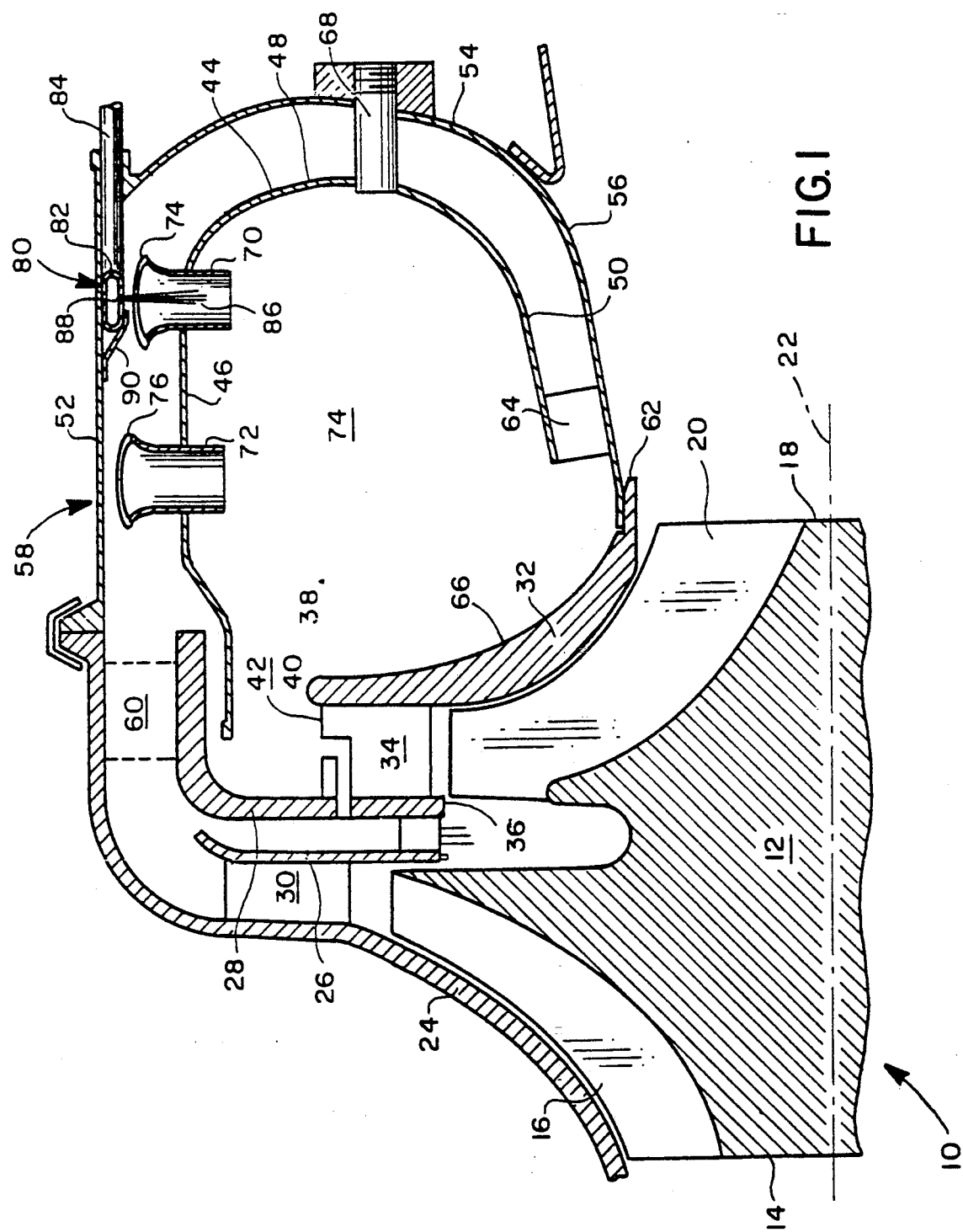
FIG. 1 is a fragmentary, sectional view of a gas turbine made according to the invention.

Exemplary embodiments of a gas turbine engine made according to the invention are illustrated in the drawings and with reference to FIG. 1 are seen to include a rotor, generally designated 10, having a hub 12. One side 14 of the hub 12 mounts compressor blades 16 to define a radial discharge, rotary compressor while the opposite side 18 of the hub 12 mounts turbine blades 20 to define a radial turbine wheel. The hub 12 is mounted by means (not shown) for rotation about an axis 22, the arrangement being such that the turbine wheel defined by the blades 20 is coupled to and drives the rotary compressor defined by the blades 16.

A compressor shroud 24 is in close adjacency to the blades 16 and together with a wall 26 that parallels a front turbine shroud 28 mounts diffuser vanes 30 of conventional construction.

The engine includes a rear turbine shroud 32 which is in close proximity to the turbine blades 20. Turbine nozzle defining vanes 34 extend between the radially inner end 36 of the front turbine shroud 28 and the radially outer end 38 of the rear turbine shroud 32 to define a nozzle for directing gases for combustion against the blades 20 to drive the same.

The leading edges 40 of the nozzle vanes 34 face an outlet area 42 of an annular combustor 44. The annular combustor includes a radially outer wall 46, a generally radially extending wall 48 and and radially inner wall 50 respectively spaced from a radially outer wall 52, a generally radially extending wall 54 and a radially inner wall 56 of a case, generally designated 58. The case 58 is in surrounded relation to the annular combustor 44 and includes an inlet area 60 connected to the downstream side of the diffuser defined by the vanes 30 so as to receive compressed air therefrom. The radially inner wall 56 of the case 58 terminates in abutment with the radially inner end 62 of the rear engine shroud 32 and swirler blades 64 extend between the walls 50 and 56.

The space between the combustor 44 and the case 58 defines a plenum that continues substantially about the combustor 44 to terminate at the vanes 64. Compressed air passing through such plenum has swirl imparted thereto by the vanes 64 and such swirl causes the air flow to sweep along the surface 66 of the rear turbine shroud 32 facing the combustor 44 toward the outlet 42 to cool the surface 66.

An igniter 68 may be mounted on the case wall 54 and extend through the combustor wall 48 to provide a means of causing ignition within the combustor 44.

At angularly spaced locations, air inlet tubes 70 and 72 in rows extend from the space between the combustor 44 and the case 58, that is, the plenum defined by the same, into the interior 74 of the combustor 44. The tubes 70 are in a common plane that is transverse to the rotational axis 22 of the apparatus and in relatively close proximity to the radially extending combustor wall 48 while the tubes 72 are likewise in a second plane that is also transverse to the axis 22 and are located intermediate the outlet 42 for the combustor 44 and the row of tubes 70.

FIG. 2 illustrates a typical orientation for the tubes 70 as well as the tubes 72 though not actually shown therein. It can be seen that the same are mounted in and extend through the radially outer wall 46 of the combustor 44 and are disposed so as to be generally tangential to the interior 74 of the combustor 44. The tubes 70 and 72 also have radially outer, flared ends 74 and 76, respectively which open to the plenum to receive compressed air therefrom. Typically, compressed air in the plenum will be swirling circumferentially as it travels through the plenum and in such a case, the tubes 70 and 72 are configured to have their flared ends 74 and 76 upstream in the direction of such circumferential flow. In any event, the arrangement of the tube causes the compressed air from the compressor 16 to enter the combustor 44 flowing in a generally tangential or circumferential direction as opposed to flowing axially as is more frequently the case in gas turbine engines.

To provide for the injection of fuel into the interior 74 of the combustor 44, there is provided a combination manifold and injector, generally designated 80. The manifold/injector 80 is formed of a flattened tube 82 that is generally annular in configuration in the sense that it extends about the interior of the radially outer wall 52 of the case 58 about the axis 22 of the machine. The tube 82 is preferably flattened so as to minimize any impediment to the flow of air in the space between the case 58 and the combustor 44 and is located in the same plane as that containing the injectors 70. At one location, an axially extending tube 84 in fluid communication with the interior of the tube 82 is connected to the fuel system of the machine.

In the usual case, fuel and air from the compressor are injected into the combustor 44 through the tubes 70, the air being in insufficient amount to stoichiometrically combine with the fuel also being injected. As seen in FIG. 1, a stream of fuel is shown at 86 and such stream 86 emanates from an aperture 88 in the flattened tube 82.

The remainder of the air required to stoichiometrically combust the fuel enters the combustor 44 through the tubes 72.

According to the invention, the flattened tube 82 is mounted against the radially outer wall 52 of the case 58. This mounting can be achieved through the use of brackets such as that shown at 90 which are somewhat S-shaped and which are secured to both the flattened tube 82 and the interior wall 52 of the case 58 at angularly spaced locations about the circumferential extent of the flattened tube 82. By mounting the flattened tube 82 against the case 58, the distance of the same from the hotter running combustor 44 is maximized, enabling the fuel system to run as cool as possible.

As can be seen in FIGS. 2 and 3, a good degree of atomization of fuel exiting the flattened tube 82 via the apertures 88 can be achieved if the apertures 88 are directed tangentially to the interior 74 of the combustor 44. This arrangement is perhaps best shown in FIG. 3 and it will be noted that the longitudinal axis of each aperture 88 is generally coaxial with the longitudinal axis of the corresponding tube 70. However, in some instances, it may be advantageous to have the aperture 88 displaced upstream of the axis of a tube 70 in order to account for circumferential displacement of the fuel stream 86 as a result of the circumferential flow of air within the plenum.

A less expensive alternative is illustrated in FIG. 4. In this embodiment, the apertures are given the reference numeral 100 and it can be seen that the same are directed purely radially to provide the fuel stream 86. This embodiment has the advantage that it is easier to form the apertures 100 since they are being formed essentially at right angles, to the longitudinal axis of the flattened tube 82 rather than at an acute angle thereto.

Still another embodiment is illustrated in FIGS. 5 and 6. In this embodiment, radial apertures 100 like those shown in FIG. 4 are employed in connection with an impingement plate 102. Each impingement plate has a base section 104 which is secured to the radially inner surface 106 of the flattened tube 82 by any suitable means, typically by brazing. Connected to the base section 104 is an impingement section 108 which extends away from the surface 106 of the tube 82 into the path of fuel passing through the aperture 100. As a consequence, when the fuel impinges upon the impingement section 108, it is deflected into a flat spray shown at 110 in FIG. 5 which runs generally along the axis of the corresponding tube 70. The embodiment of FIGS. 5 and 6 provides the best atomization of the various embodiments illustrated.

In the embodiment illustrated in FIGS. 1 and 4, that is, the one utilizing only the apertures 100, the intersection of the radially outer wall 46 of the combustor 44 and the plane containing the tubes 70 is imperforate save for the location whereat the tubes 70 pass through the wall 46 itself. That is to say, such an area is imperforate and is characterized by the absence of any film air cooling. In the usual case, because the atomization provided by the embodiment of FIGS. 1 and 4 is not substantial, and due to the circumferential swirl occurring within the interior 74 of the combustor 44, fuel droplets will tend to centrifuge out against the radially outer wall 46 in the aforementioned area which is imperforate and free of film air cooling. At this location, the fuel will burn with a blue flame in a stable fashion because it is not being disturbed by cooling air films or the like that are conventionally employed to cool the combustor 44. In fact, the liquid fuel may deposit itself on the wall 46 and the hot gases of combustion flowing circumferentially within the combustor 44 at this location will cause rapid evaporation at the interior surface of the resulting layer of fuel which will then be ignited by the hot gases of combustion. The blue flame resulting from such combustion does not create a great deal of radiant energy that would require film air cooling of the combustor 44, thus enabling the relatively poor atomization of the fuel system of FIG. 4 to be employed.

In those instances where somewhat better atomization is obtained as, for example, in the use of the embodiments of FIGS. 3, 5 and 6, at various locations, the radially outer wall 46 of the combustor 44 may be provided with rows of apertures 120 through which compressed air from the plenum may enter the combustor 44. Cooling air strips 122 mounted to the combustor wall 46 and extending axially therealong may be employed to direct the entering air generally circumferentially along the surface 46 in a film-like fashion as is known.

From the foregoing, it will be appreciated that a gas turbine engine made according to the invention advantageously employs a combination manifold/injector structure 80 which may easily be formed by simply flattening a conventional round tube and by boring the aperatures 88 or 100 at desired locations therein so as to align with the tubes 70 when installed in place. Because only simple boring operations need be performed on the flattened tube 82, the cost of fabricating the injector system is considerably reduced over prior art systems requiring precision machining.

I claim:

1. A gas turbine comprising:
a rotary compressor;
a rotatable turbine wheel coupled to said compressor to drive the same;
an annular nozzle for directing gases of combustion at said turbine wheel;
an annular combustor having an outlet connected to said nozzle;
a case in spaced relation to said combustor to define a plenum connected to said compressor;
angularly spaced inlet tubes oriented generally tangentially to the interior of the combustor and extending into the same from said plenum to create circumferential gas flow within said combustor;
a flattened tube of generally annular configuration within said plenum and adapted to be connected to a source of fuel under pressure; and
apertures in said flattened tube at angularly spaced location corresponding to at least some of said inlet tubes and each aligned with a corresponding inlet tube.

2. The gas turbine of claim 1 wherein said apertures are oriented to be generally tangential to said combustor.

3. The gas turbine of claim 1 further including impingement plates in the path of fuel flowing from said apertures.

4. The gas turbine of claim 3 wherein said impingement plates are mounted on said flattened tube.

5. The gas turbine of claim 4 wherein each said impingement plate has a base section secured to said flattened tube and an impingement section attached to said base section and extending to said base section and extending away from said flattened tube into a corresponding path of fuel.

6. A gas turbine comprising:
a rotary compressor;
a rotatable turbine wheel coupled to said compressor to drive the same;
an annular nozzle for directing gases of combustion at said turbine wheel;
an annular combustor having an outlet connected to said nozzle;
a case in spaced relation to said combustor to define a plenum connected to said compressor;
angularly spaced inlet tubes oriented generally tangentially to the interior of the combustor and extending into the same from said plenum to create circumferential gas flow within said combustor;
a fuel tube of generally annular configuration within said plenum and mounted on said case in spaced relation to said combustor and further adapted to be connected to a source of fuel under pressure; and
apertures in said fuel tube at angularly spaced locations corresponding to at least some of said inlet tubes and each aligned with a corresponding inlet tube.

7. The gas turbine of claim 6 wherein said apertures are oriented to be generally tangential to said combustor.

8. The gas turbine of claim 6 further including impingement plates in the path of fuel flowing from said apertures.

9. The gas turbine of claim 8 wherein each said impingement plate has a base section secured to said fuel tube and an impingement section attached to said base section and extending away from said flattened tube into a corresponding path of fuel.

10. A gas turbine comprising:
a rotary compressor;
a rotatable turbine wheel coupled to said compressor to drive the same;
an annular nozzle for directing gases of combustion at said turbine wheel;
an annular combustor having an outlet connected to said nozzle;
a case in spaced relation to said combustor to define a plenum connected to said compressor;

angularly spaced inlet tubes oriented generally tangentially to the interior of the combustor and extending into the same from said plenum to create circumferential gas flow within said combustor;

a flattened tube of generally annular configuration within said plenum and mounted on said case in spaced relation to said combustor and further adapted to be connected to a source of fuel under pressure; and apertures in said fuel tube at angularly spaced locations corresponding to at least some of said inlet tubes and each aligned with a corresponding inlet tube.

11. The gas turbine of claim 10 wherein said combustor has a radially outer wall and said inlet tubes are in a common plane transverse to the axis of rotation of said turbine wheel, said radially outer wall being imperforate in the area whereat it is intersected by said plane.

* * * * *